US005565680A

United States Patent [19]

Naito et al.

[11] Patent Number: 5,565,680

[45] Date of Patent: Oct. 15, 1996

[54] HIGH FREQUENCY MASS SPECTROMETER

[75] Inventors: Yoshihiko Naito; Osamu Horita; Kazutoshi Nagai, all of Fujisawa, Japan

[73] Assignee: Ebara Corporation, Tokyo, Japan

[21] Appl. No.: 517,793

[22] Filed: Aug. 22, 1995

[30] Foreign Application Priority Data

| | | | |
|---|---|---|---|
| Aug. 23, 1994 | [JP] | Japan | 6-221162 |
| Aug. 23, 1994 | [JP] | Japan | 6-221163 |
| Aug. 23, 1994 | [JP] | Japan | 6-221164 |
| Aug. 23, 1994 | [JP] | Japan | 6-221165 |

[51] Int. Cl.[6] .............................. B01D 59/44; H01J 49/00

[52] U.S. Cl. .............................. 250/293; 250/290

[58] Field of Search .............................. 250/293, 290, 250/287, 288

[56] References Cited

U.S. PATENT DOCUMENTS

| | | | |
|---|---|---|---|
| 2,818,507 | 12/1957 | Britten | 250/293 |
| 2,911,532 | 11/1959 | Tipotsch | 250/290 |
| 2,939,126 | 5/1960 | Barghausen | 250/288 |
| 2,959,676 | 11/1960 | Burk | 250/293 |
| 3,107,295 | 10/1963 | Tretner | 250/293 |

FOREIGN PATENT DOCUMENTS 1378864 2/1965 France .

OTHER PUBLICATIONS

Blauth, "Dynamic Mass Spectrometers", pp. 37–45, Elsevier Publishing Company (1966).

International Journal of Mass Spectrometry and Ion Processes, vol. 59, No. 3, Aug. 1984, Amsterdam NL, pp. 303–313, R. Eng et al., "Study Of The Background Currents In The Radiofrequency Mass Spectrometer".

*Primary Examiner*—Bruce C. Anderson

*Attorney, Agent, or Firm*—Wenderoth, Lind & Ponack

[57] ABSTRACT

A compact mass spectrometer apparatus is presented to enable accurate qualitative and quantitative analyses of target ions. The apparatus can operate in a relatively poor vacuum in the range of $10^{-2}$ to $10^{-3}$ torr compared with the conventional requirement of $10^{-6}$ to $10^{-8}$ torr while providing precision results with lesser number of electrodes than the conventional mass spectrometer. The separation of the ionic species is achieved through two effects: flight time differentials produced by varying mass/charge ratios of the sample ions; as well as high frequency resonance separation by synchronizing the injection of ions with high frequency electric field applied to an electrode system having equipotential space and high frequency space. The resulting dispersion in the wide energy spectra of the sample ions serves to accurately identify the sample ions both qualitatively and quantitatively. The spectra dispersion is achieved by modulating the ion beam with application of suitable magnitude and phase angle of the high frequency voltage, and allowing only those ions having the maximum kinetic energy to pass through to a collector electrode. The analyses are based on measurements of the maximum ion current flowing in the collector electrode.

10 Claims, 19 Drawing Sheets

RESULT OF QUALITATIVE ANALYSIS OF HELIUM GAS

HIGH FREQUENCY MASS SPECTROMETER

BACKGROUND OF THE INVENTION

1. Field of the Invention

The present invention relates in general to mass spectrometers for analyzing differences in the mass of atomic or molecular ions by utilizing electromagnetic interactions, and relates in particular to a high frequency type mass spectrometer which performs mass separation of the ions with the use of high frequency electrical field.

2. Description of the Related Art

FIG. 11 shows a conventional mass spectrometer of the high frequency separation type called Topatron. This type of mass spectrometer comprises: an ion source 21 for releasing sample ions; an energy filter 22 for passing only selected ions having a specific energy level; a current detection electrode 23; an analyzer section 25 comprising a plurality of electrodes 24; an extractor electrode 27 for pulling out ions; a repeller electrode 26 for passing only those ions having the highest energy level and repelling those ions having an energy less than the specified level; a collector electrode 28 for collecting the ions that passed through the electrode group; and an ammeter 29 provided for the collector electrode 28.

The sample ions released from the ion source 21 are guided to the energy filter 22 so as to pass only those ions having a specific energy level, and the total energy of the ions having the maximum energy level is determined by measuring the ion current with the current detection electrode 23. A high frequency electrical field is applied to the plurality of electrodes 24 in the analyzer section 25 so that only those ions (having the specific energy level) that are in resonance with the applied high frequency field are allowed to pass through, and the energy of all other ions are diminished. The repeller electrode 26 selectively passes only those ions having the highest energy level, and after collecting the ions with the collector electrode 28, the amount of the collected ions is determined from the reading of the ammeter 29. By comparing the ratio of the current measured with the current detection electrode 23 to that measured with the ammeter, it is possible to compute the ratio (of the energies) of the target ions to the injected sample ions.

In this type of apparatus, it is necessary to provide a large number of electrodes 24 to improve the resolving power. The flight distance (mean free path) in such an arrangement of the electrodes is inevitably increased, and the apparatus does not function unless a high vacuum (higher than $10^{-5}$ torr) is provided. Furthermore, this type of apparatus has other problems such as the large size of the equipment because of the requirement of a large number of electrodes.

SUMMARY OF THE INVENTION

The present invention is provided to resolve the problems in the conventional mass spectrometer apparatus as outlined above, and it is an object of the present invention to provide a compact mass spectrometer apparatus of a high frequency type which can be operated at a relatively low vacuum. The object is achieved in a mass spectrometer apparatus comprising: an ion source for generating sample ions; an electrode system comprising a plurality of mesh electrodes disposed along an ion beam line; an ammeter for measuring an ion current produced by sample ions that passed through said electrode system; wherein said electrode system is provided with a high frequency space for application of a high frequency electric field between opposing mesh electrodes; and the sample ions are imparted with a specific kinetic energy and are injected from the ion source toward the electrode system synchronously with a phase of the high frequency electric field as to produce a spectrum of motion energies of sample ions that pass through the high frequency space and to selectively collect only those sample ions having a maximum kinetic energy for mass spectrometric analysis.

The object is achieved in another embodiment of the apparatus comprising: an ion source for generating sample ions; an electrode system comprising a plurality of mesh electrodes disposed along an ion beam line; an ammeter for measuring an ion current produced by sample ions that passed through the electrode system; wherein, along the ion beam line are disposed an equi-potential space having an equal voltage and a high frequency space impressed with a high frequency electric field between opposing mesh electrodes; and the sample ions are imparted with a specific kinetic energy and are injected from the ion source towards the electrodes system synchronously with a phase of the high frequency electric field, and the electrode system is operated so as to produce a spectrum of motion energies of sample ions by passing the sample ions through the equi-potential space and then through the high frequency space to selectively collect only those sample ions having a maximum kinetic energy for mass spectrometric analysis.

According to the structural configuration of the apparatuses presented above, the electrode system disposed along the ion beam line comprises the plurality of mesh electrodes disposed parallel to each other in the mass analyzer section, and is divided into equi-potential spaces sharing a same electrical potential. Experimentally, this is achieved by connecting a power source to both electrodes in a pair of opposing electrodes or by grounding both opposing electrodes. The ion beam is made to pass through the equi-potential space before passing through the high frequency space.

At the entrance to the equi-potential space, the sample ions, having a same kinetic energy but differing masses, have different speeds depending on their mass. This effect give rise to differences in the time of passing through the equi-potential space, thus giving rise to a first separation by time-of-flight analysis. Next, in the high frequency space, the sample ions passing through this space are affected by the high frequency electrical field, and their motion energies are dispersed in accordance with the ratio of mass (m) to charge (e). The sample ions that have passed through the equi-potential space have already experienced arrival time differences in reaching the high frequency space, where they produce phase differentials at the high frequency electrodes in the high frequency electrical space to cause further dispersion in the energies. The present invention thus achieves the object of mass spectrometric analysis with a comparatively lesser number of electrodes by combining the principle of time-of-flight analysis and the ion energy dispersion produced by an application of high frequency electric field.

An aspect of the equi-potential space presented above is that it can comprise two types: the equi-potential space may be comprised of the electrodes which are grounded (defined as the grounded equi-potential space); and/or the equi-potential space may be comprised of the electrodes applied with a high frequency electric field (defined as the high frequency equi-potential space). The principle of operation within the equi-potential space is based on the time-of-flight analysis while that within the high frequency equi-potential space is based on phase-selected application of a high frequency electric field. This is accomplished by subjecting the sample ions that have passed through the equi-potential space with a high frequency electric field of a different phase when entering the equi-potential space than when leaving the equi-potential space. It is clear that the ratio of the mass to charge of the sample ions similarly affects the flight time-differentiated ions.

Regrading the disposition of the equi-potential and high frequency spaces along the beam line, a number of combinations may be considered. The equi-potential space may comprise one of either the grounded equi-potential space or the high frequency equi-potential space or a combination of these two types of spaces. Combination of the spaces may be made by an alternating arrangement of each space or by a periodic arrangement of the two types of spaces. The various combinations of the two types of spaces further enhances the resolving power of the apparatus by broadening the spectrum of ion energies. It is the presence of the electrode system that enables dispersion of the energies of the sample ions into identifiable components by selectively strengthening target ions while diminishing all other ions for the ultimate collection of only those target ions having the maximum energy. The apparatus thus enables significant simplification of the electrode system. Therefore, the apparatus retains the analytical precision of the conventional apparatus while significantly simplifying the electrode arrangement and making the apparatus more compact. Because the electrode system permits a short mean free path of the ions, the analysis can be performed in a relatively low degree of vacuum in the range of $10^{-2}$ to $10^{-3}$ torr, thus enabling the apparatus to be even more compact and cost effective.

DESCRIPTION OF THE PREFERRED EMBODIMENTS

Figure 1A:
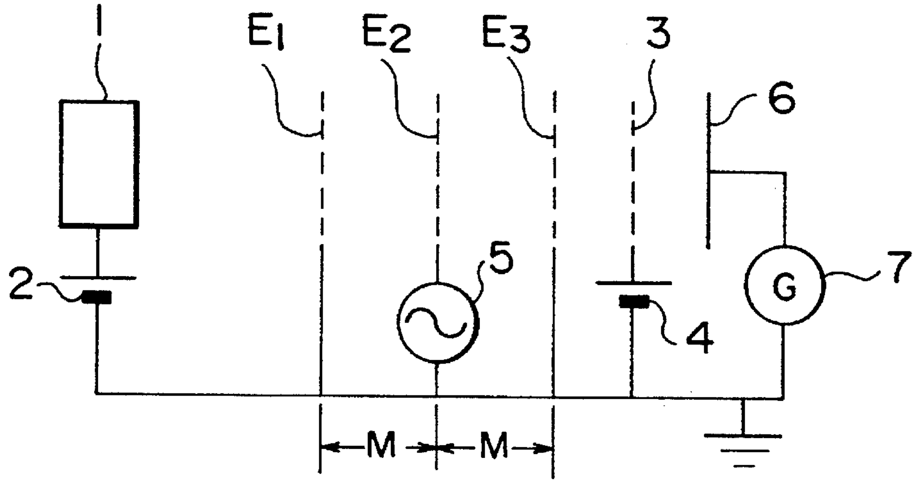
FIGS. 1A–D show schematic diagrams of the first example of the embodiment of the high frequency mass spectrometer of the present invention.

FIG. 1A shows a first example of the high frequency mass spectrometer of the present invention. The ion source 1 produces sample ions by bombardment of thermal electrons which are emitted from heated filament. The ion source 1 is connected to a grounded direct current power source 2 at 70–100 volts for the ion acceleration purpose. This section if followed by a first flat mesh electrode $E_1$, a second flat mesh electrode $E_2$, a third flat mesh electrode $E_3$ and a repeller electrode 3 connected to a direct current power source 4, which passes only those ions having higher than a specific level of kinetic energy. Each of these four electrodes is a flat mesh electrode (shortened to mesh electrode hereinbelow) made by weaving fine wires of stainless steel, for example, and an ion beam passes through the center section of the four electrodes disposed parallel to each other, designating an ion beam path. The first electrode $E_1$ and the third electrode $E_3$ are grounded, and a high frequency power source 5 is connected to the second electrode $E_2$. This configuration produces a high frequency (electrical field) space M between the first electrode $E_1$ and the second electrode $E_2$ as well as between the second electrode $E_2$ and the third electrode $E_3$. For example, a high frequency electric field at about 30 MHz may be applied to the second electrode $E_2$. An ion collector electrode 6 having a series-connected ammeter 7 is provided to measure small amounts of current produced by the ions. The ion source 1, the mesh electrodes $E_1$, $E_2$, $E_3$, ion repeller electrode 3 and the ion collector electrode are housed in an evacuated chamber held at not less than about $10^{-8}$ torr.

The operation of the mass spectrometer of the structure presented above will be explained in the following. The sample ions generated by the ion source 1 having a specific level of kinetic energy are accelerated towards the mesh electrode $E_1$ by the voltage of the ion acceleration source 2. The ion release is timed so that the accelerated ions passing through the center of the electrodes $E_1$, $E_2$ are synchronized with a phase of a specific high frequency electric field M. The sample ions passing through the mesh electrode $E_1$ reach the mesh electrode $E_2$ while being forced to disperse making a spectrum of motion energies by the high frequency electrical field present between the mesh electrodes $E_1$, $E_2$, depending on the ratio of the ionic mass (m) and the charge (e) of the respective ions.

After passing through the second mesh electrode $E_2$, the sample ions are subjected to a high frequency electrical field of opposing polarities existing in the space M between the mesh electrodes $E_2$, $E_3$, and are forced to disperse into another spectrum of motion energies depending on the ratio (m/e). The mesh electrode 3 is under an applied voltage from the direct current power source 4 such that it is less than a voltage corresponding to the maximum energy level of the spectrum but is above the voltage corresponding to the second maxim energy level. Therefore, of the sample ions passing through the mesh electrode $E_3$, only those having the maximum level of kinetic energy level are able to pass through by overcoming the voltage of the ion repeller electrode 3. Those ions passing through the ion repeller electrode 3 reach the ion collector electrode 6 to generate a current in the ammeter 7 to enable quantitative and qualitative mass spectrometric analyses.

Figure 1B:
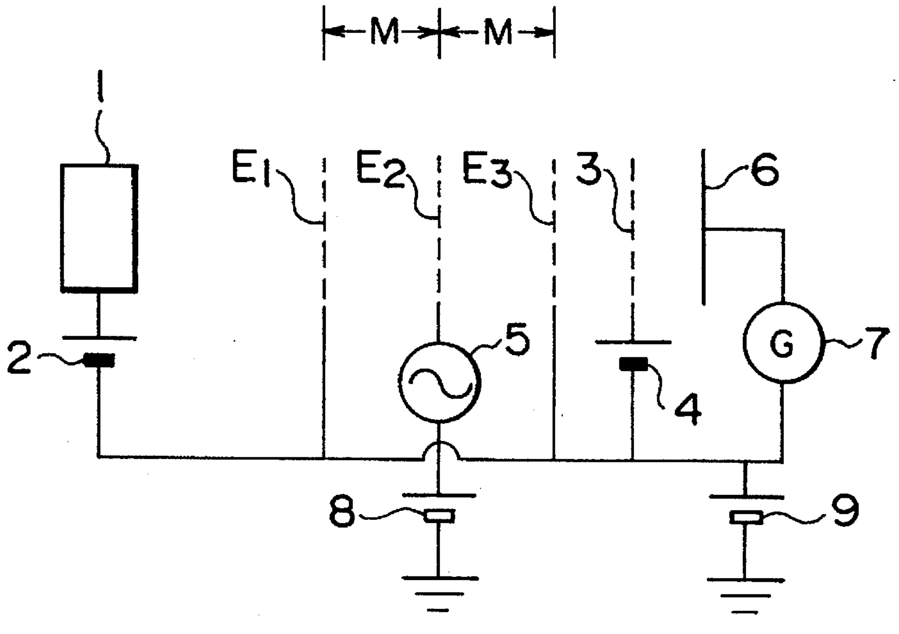

FIG. 1B also shows a second example. In the second example, the high frequency power source 5 is grounded through a direct current power source 8, and the mesh electrodes $E_1$, $E_3$ are similarly grounded through a direct current power source 9. These biasing voltages permit floating of the voltages of $E_1$, $E_2$, $E_3$ and the ion repeller electrode 3 over the ground potential, and are useful in analyzing those target elements which require high voltage application to the ions source 1.

Figure 1C:
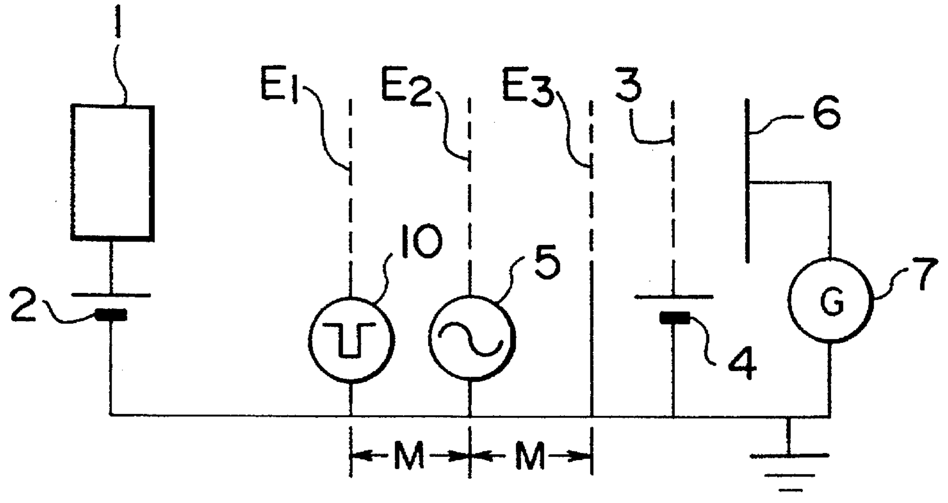
Figure 1D:
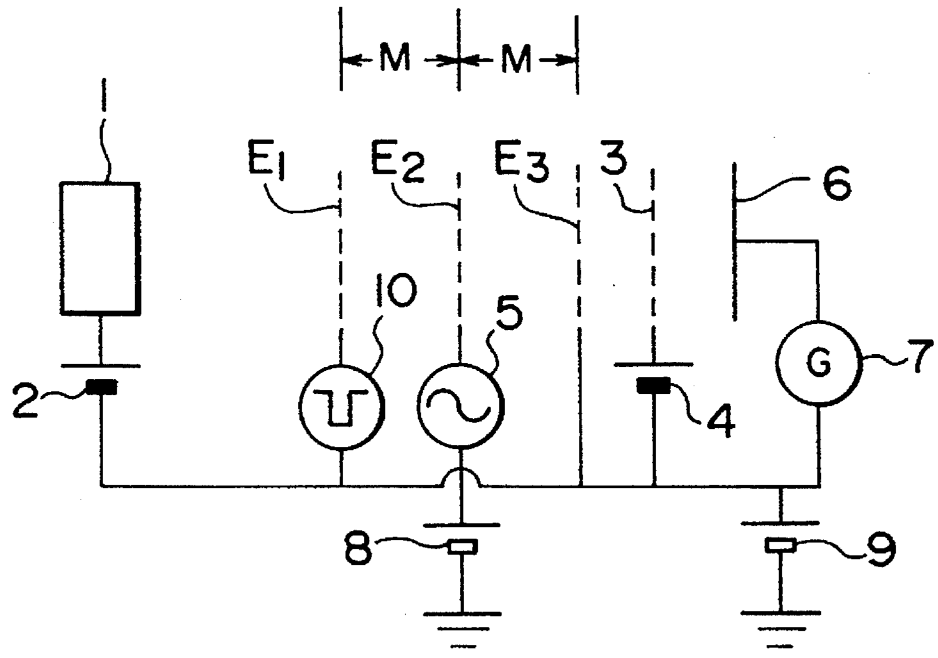

A third example is shown in FIGS. 1C and 1D. In the third example, the first mesh electrode $E_1$ is grounded through a shutter circuit 10 operated by electrical pulses. The sample ions released by the ion source 1 are accelerated towards the mesh electrode $E_1$ and are injected into the mesh electrode $E_2$ to synchronize with the phase of electrical field (in the space M) generated by the electrical field produced by the high frequency power source 5. Thus, electrical pulses are applied to the mesh electrode $E_2$ by the shutter circuit 10. Other components are the same as those presented in the previous examples. The examples shown in FIG. 1A or FIG. 1B are applicable to the case where the ion source 1 is provided with a ability to synchronize with the high frequency power source 5, but the third example is applicable to the case where the ion source 1 does not have such a ability.

FIG. 2 shows other embodiments of the present invention, where an equi-potential space is provided within the groups of electrodes. Two types of equi-potential spaces can be considered: one is shown in FIG. 2A, where the equi-potential space is grounded (grounded equi-potential space X); and another is shown in FIG. 2B, where the equi-potential space is provided with a high frequency electrical field (high frequency equi-potential space Y). The operation within the grounded equi-potential space is identical to the principle of separation according to the free flight time difference presented above. Within the high frequency equi-potential space, the sample ions are subjected to a high frequency field of a different phase when exiting the space than when entering the space.

Figure 2A:
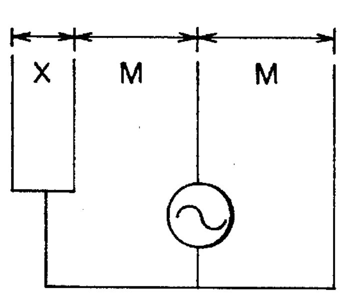
FIGS. 2A–I show illustrations of examples of an electrode group comprising the equi-potential space.
Figure 2B:
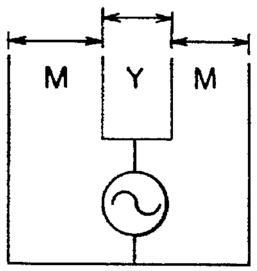
Figure 2C:
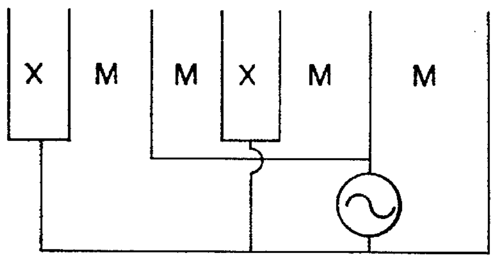
Figure 2D:
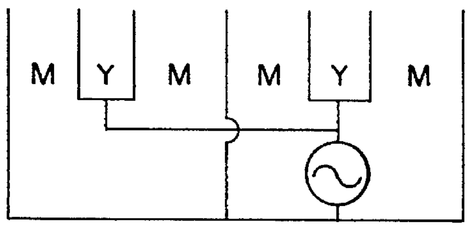
Figure 2E:
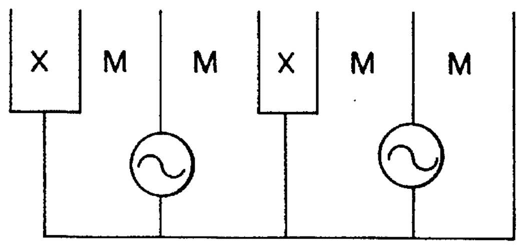
Figure 2F:
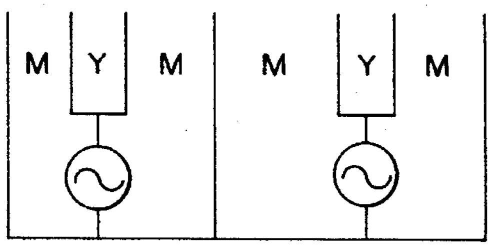
Figure 2G:
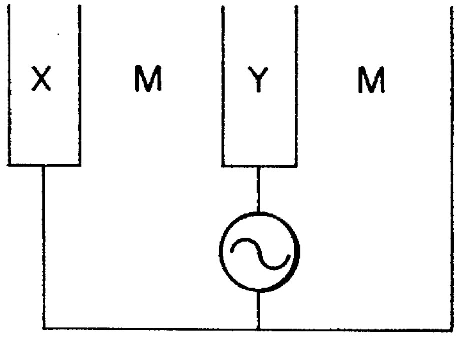
Figure 2H:
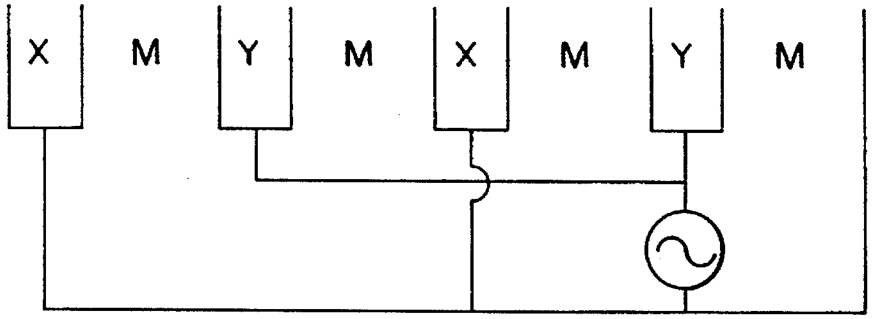
Figure 2I:
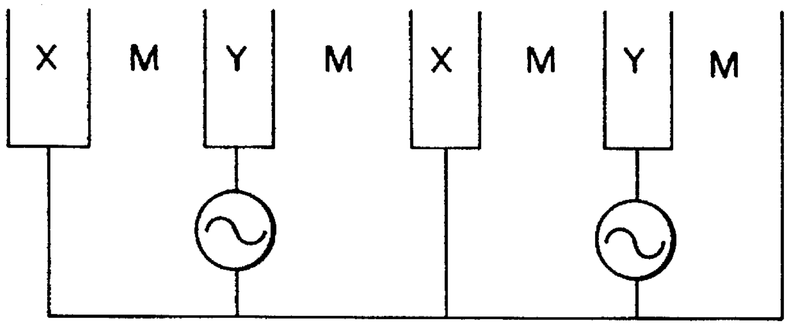

FIGS. 2A and 2B refer to the case of having only one equi-potential space, the high frequency space M follows the grounded equi-potential space X, and the high frequency equi-potential space Y has the high frequency spaces M disposed in upstream and downstream of the equi-potential space, as shown in FIG. 2B. It is permissible to provide more than two equi-potential spaces as shown in FIG. 2C where two grounded equi-potential spaces are provided or as shown in FIG. 2D where two high frequency equi-potential spaces are provided. These two high frequency equi-potential spaces are connected to the same power source, and it is not possible to separately vary the phase of the individual high frequency electrode. FIGS. 2E and 2F show a case of having individual power source for each of the high frequency electrodes, and permit varying the phase and voltage individually. FIG. 2G shows a combination of the grounded equi-potential spaces and the high frequency equi-potential spaces, and FIGS. 2H and 2I show cases of alternately disposing the grounded equi-potential spaces and the high frequency equi-potential spaces.

Figure 3A:
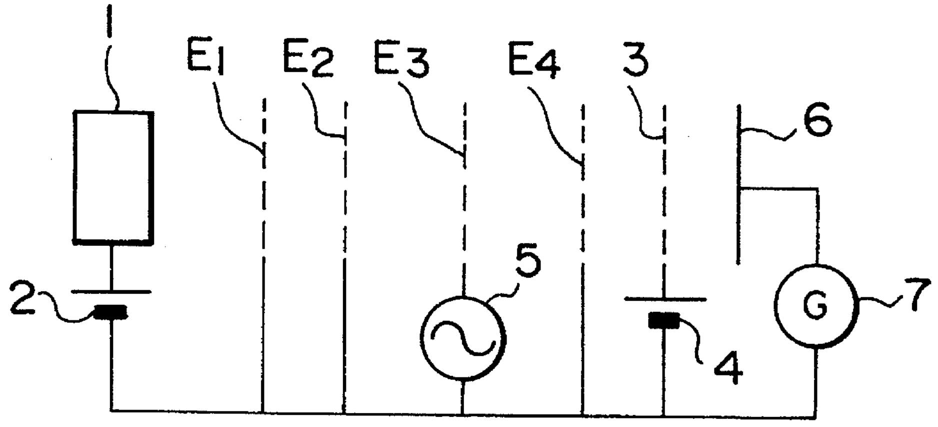
FIGS. 3A–D show schematic diagrams of the second examples of the embodiment of the high frequency mass spectrometer of the present invention.

FIG. 3A shows the overall configuration of a mass spectrometer having the electrode arrangement as in FIG. 2A, where the energy level is dispersed in the electrode section, and those ions selected by diminishing all but the ions having a specific energy level are passed through the ion repeller electrode and are further selected to be collected by the collector electrode and measured. Accordingly, the apparatus of the present invention maintains a comparable degree of analytical performance while simplifying the electrode arrangement significantly and making the apparatus much more compact compared with the conventional apparatus. The apparatus provides a short mean free path for the ions, and permits the apparatus to be operated under a relatively low vacuum ($10^{-2}$ to $10^{-3}$ torr) and the overall apparatus becomes even more compact.

Figure 3B:
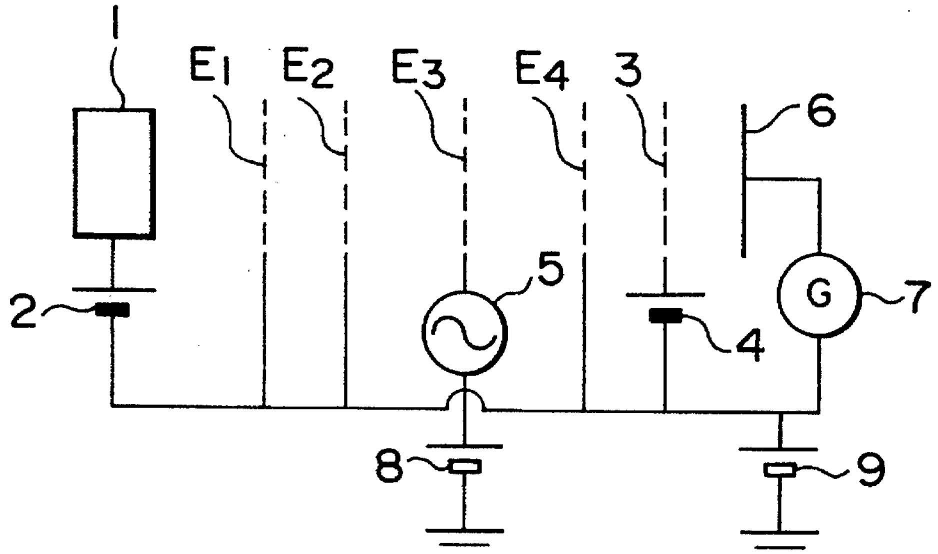

FIG. 3B shows a case where, similar to case in FIG. 1B, the high frequency electrode and/or grounded electrode are grounded through direct current power sources 8, 9 for providing a biasing potential to the electrodes. The operation and the performance are the same as the previous case. It is permissible to provide a desirable biasing voltage only to the third mesh electrode $E_2$, and the high frequency voltage can be superimposed therein.

Figure 3C:
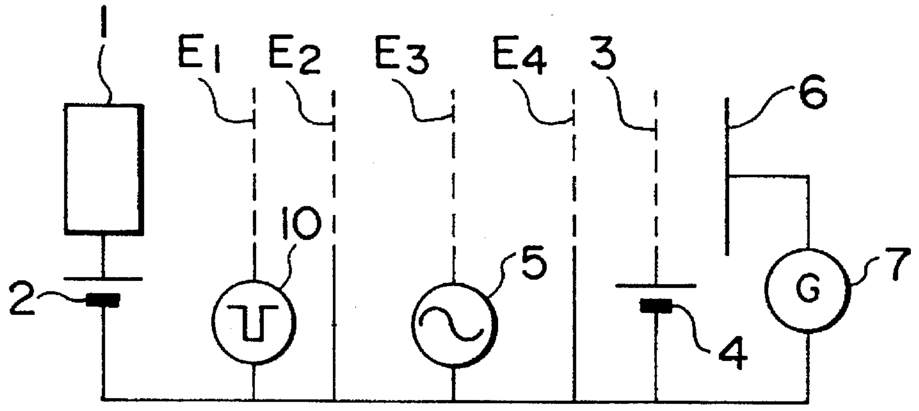
Figure 3D:
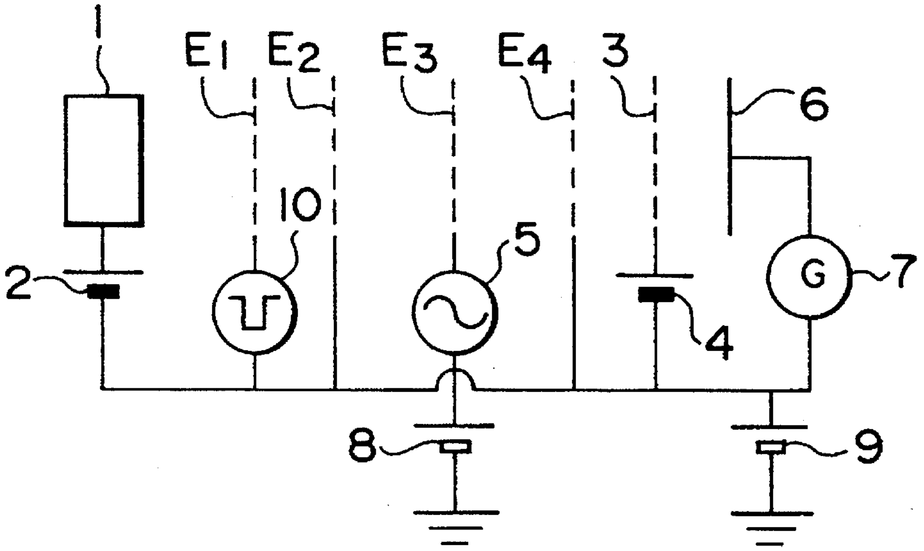

FIGS. 3C and 3D relate to other examples of the mass spectrometer of the present invention, where the first mesh electrode $E_1$ is provided with a shutter circuit 10 for injected ions to pass through the first mesh electrode $E_1$ so as to be synchronous with the specific phase of a high frequency electric field. The basic principle of operation and performance is the same as the cases in FIGS. 1C and 1D.

Figure 4A:
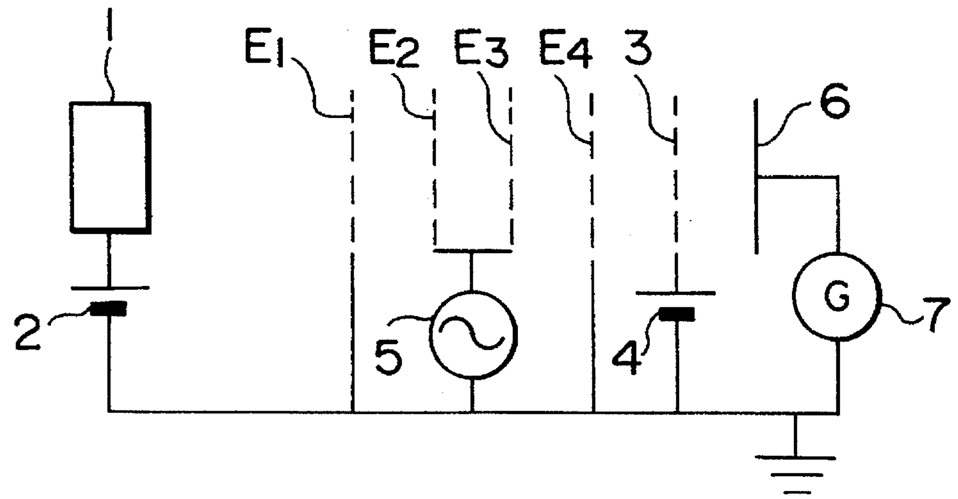
FIGS. 4A–F show schematic diagrams of the third examples of the embodiment of the high frequency mass spectrometer of the present invention.
Figure 4B:
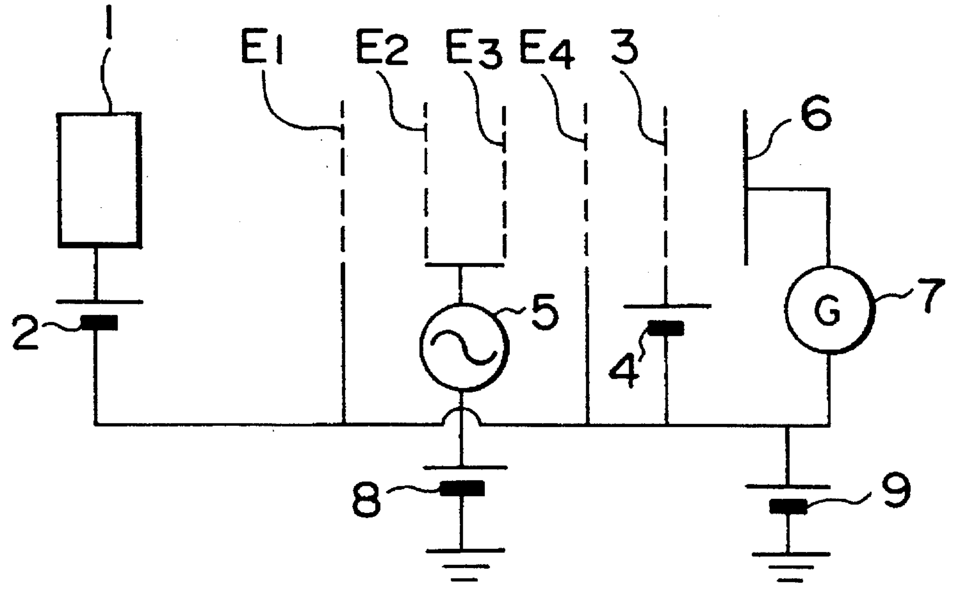
Figure 4C:
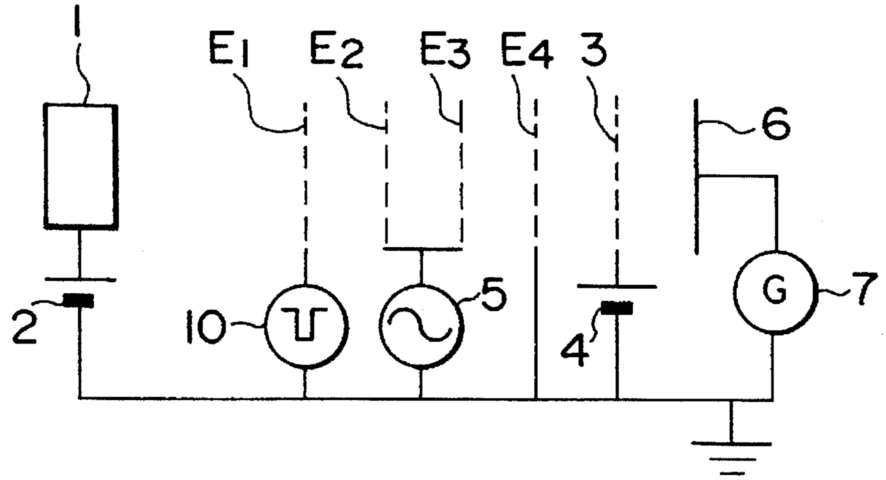
Figure 4D:
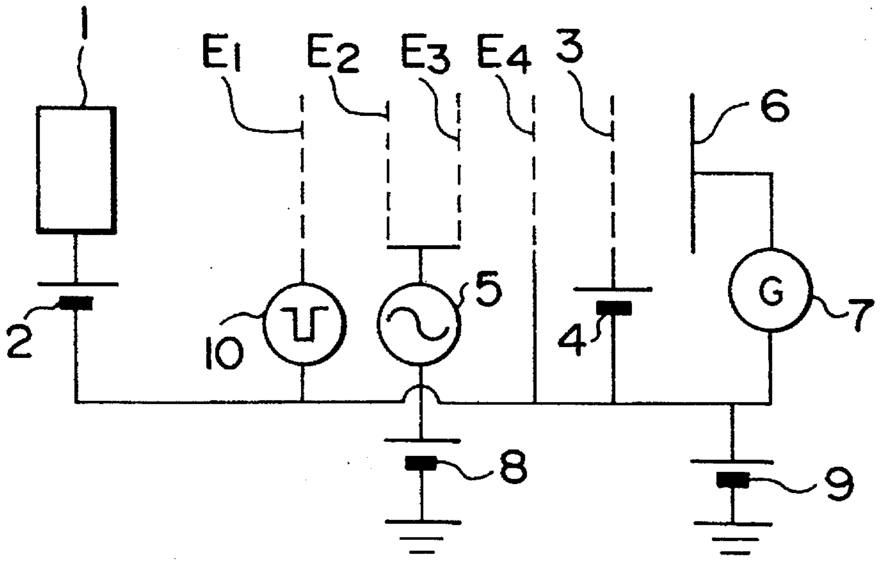
Figure 4E:
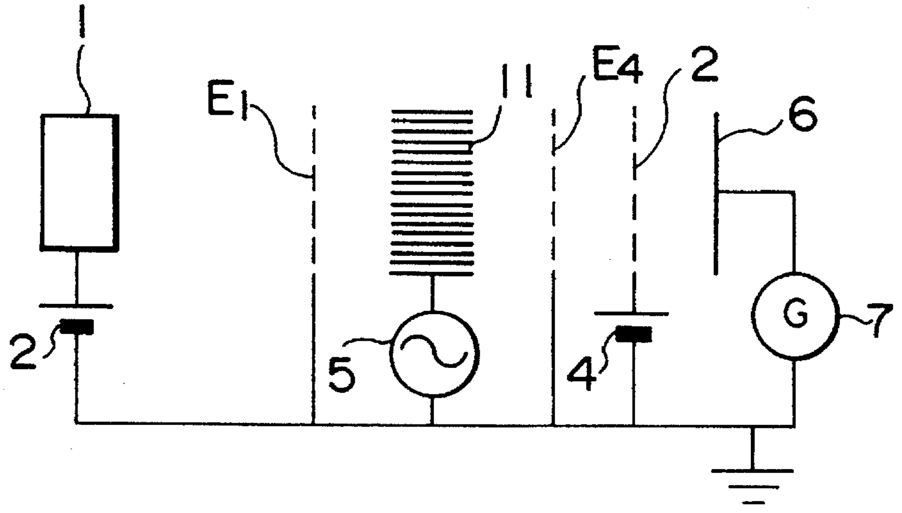
Figure 4F:
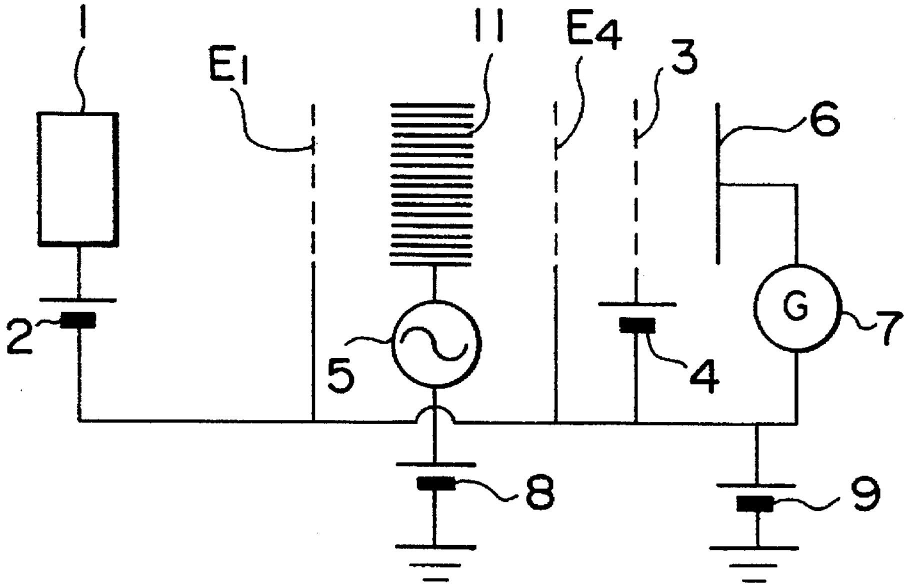

FIG. 4A shows the configuration of the high frequency mass spectrometer having the electrode arrangement shown in FIG. 2B. FIGS. 4B and 4D correspond, respectively, to FIGS. 2B and 2D. FIGS. 4E to 4F refer to an example of replacing the mesh electrodes $E_2$ and $E_3$ with one mesh electrode 11 having a certain thickness. The two mesh electrodes $E_2$, $E_3$ are connected to one high frequency power source, and-therefore, replacing two electrodes with one electrode of equivalent thickness reserves the same performance effects. By replacing with one mesh electrode of one thickness, the apparatus is made further compact.

Figure 5A:
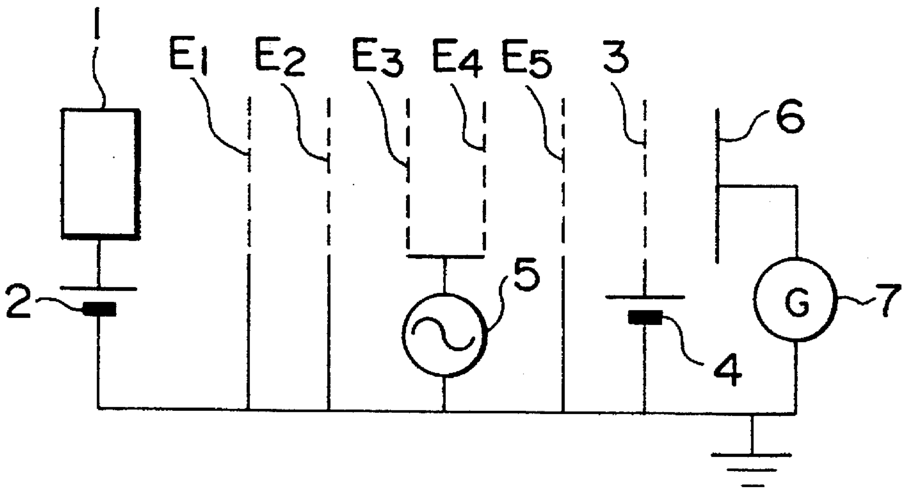
FIGS. 5A–H show schematic diagrams of the fourth examples of the embodiment of the high frequency mass spectrometer of the present invention.
Figure 5B:
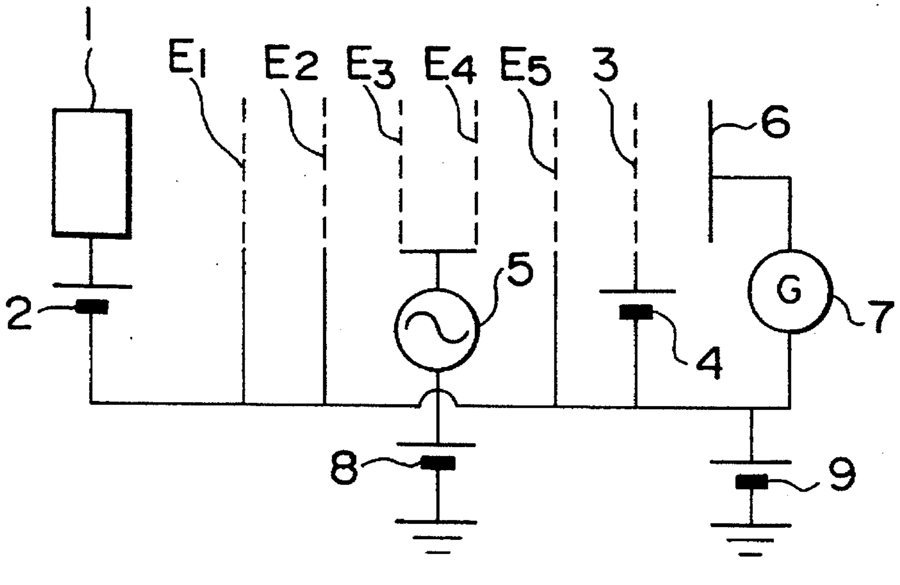
Figure 5C:
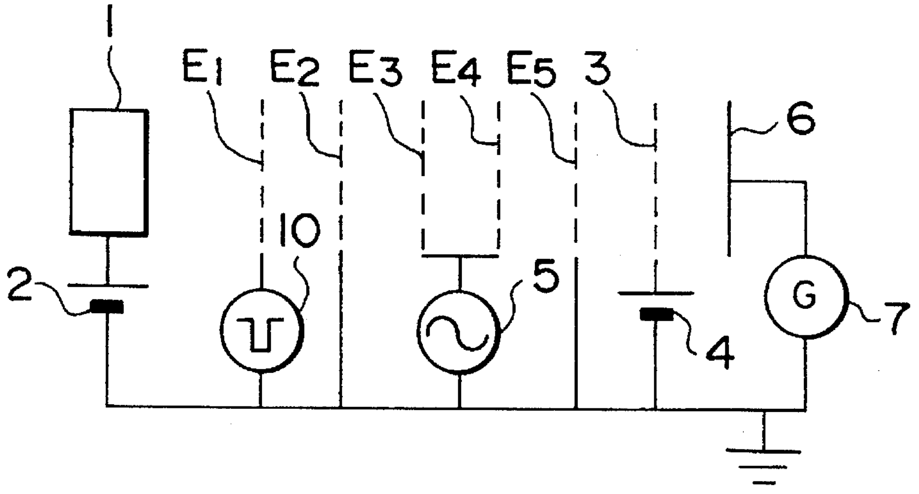
Figure 5D:
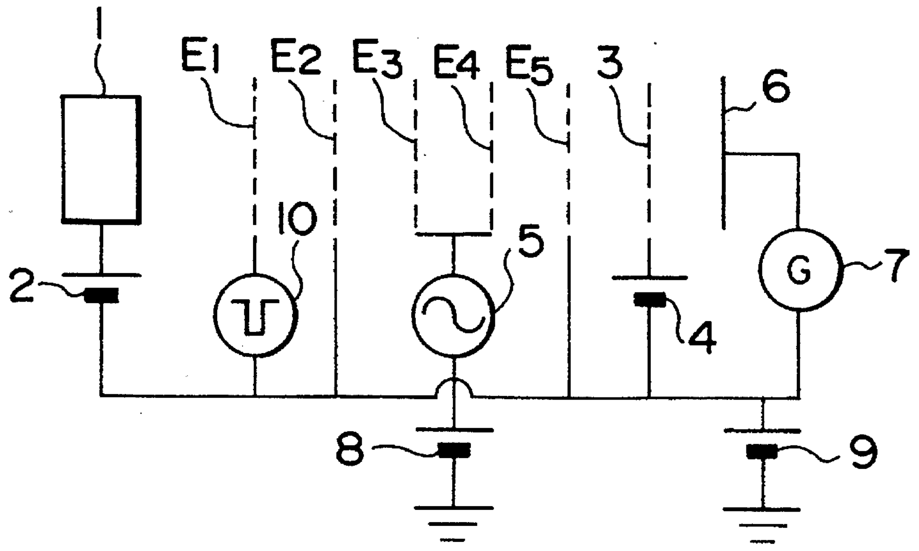
Figure 5E:
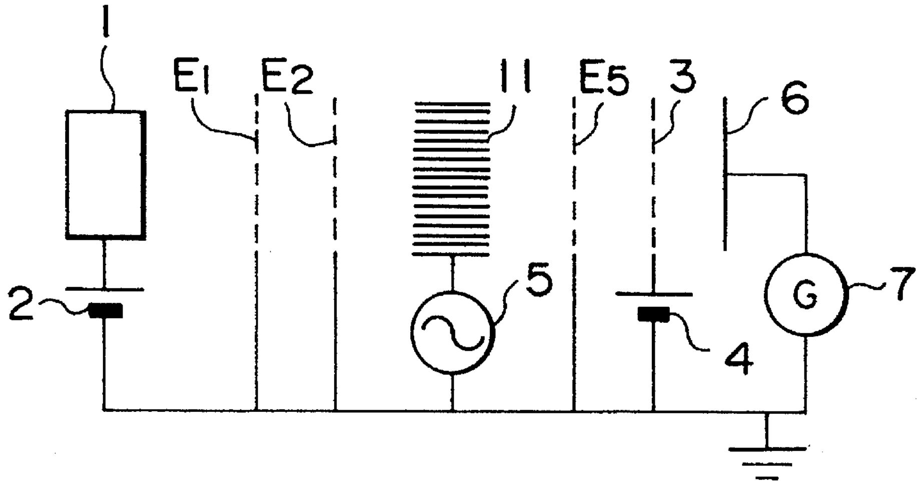
Figure 5F:
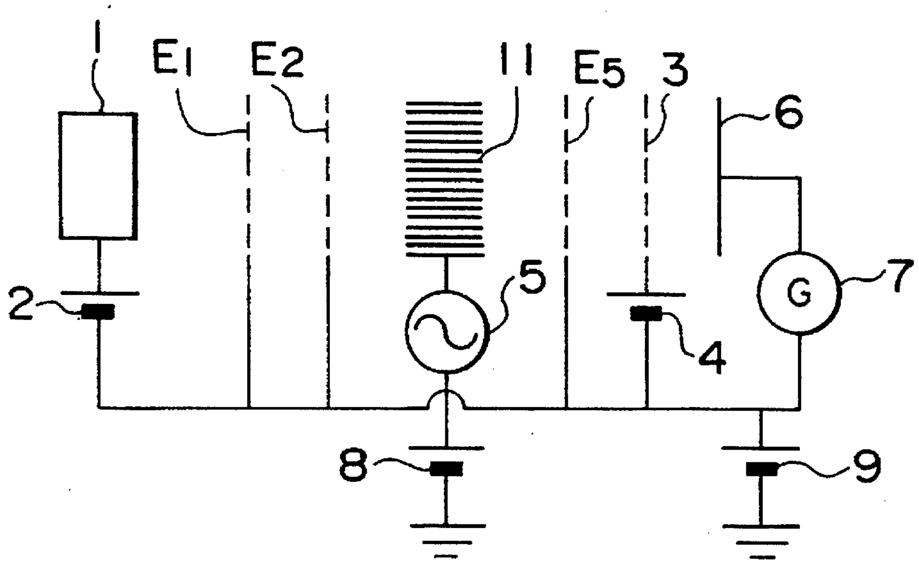
Figure 5G:
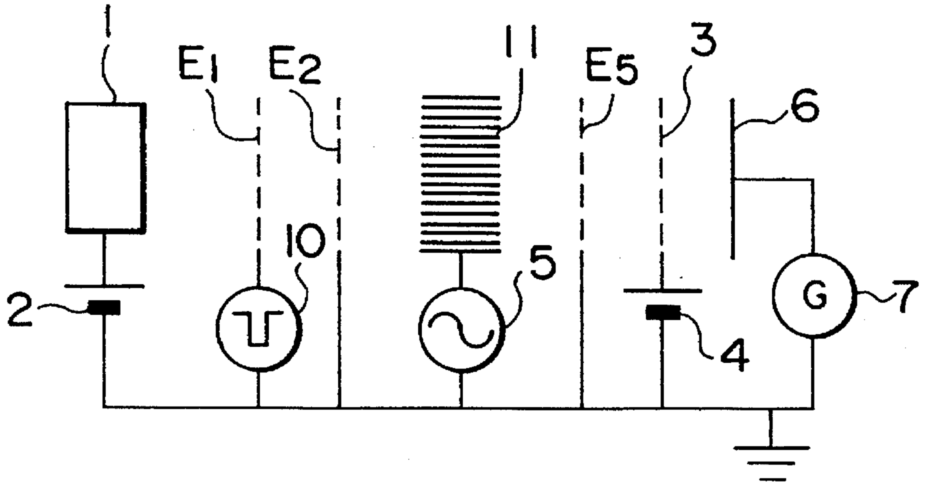
Figure 5H:
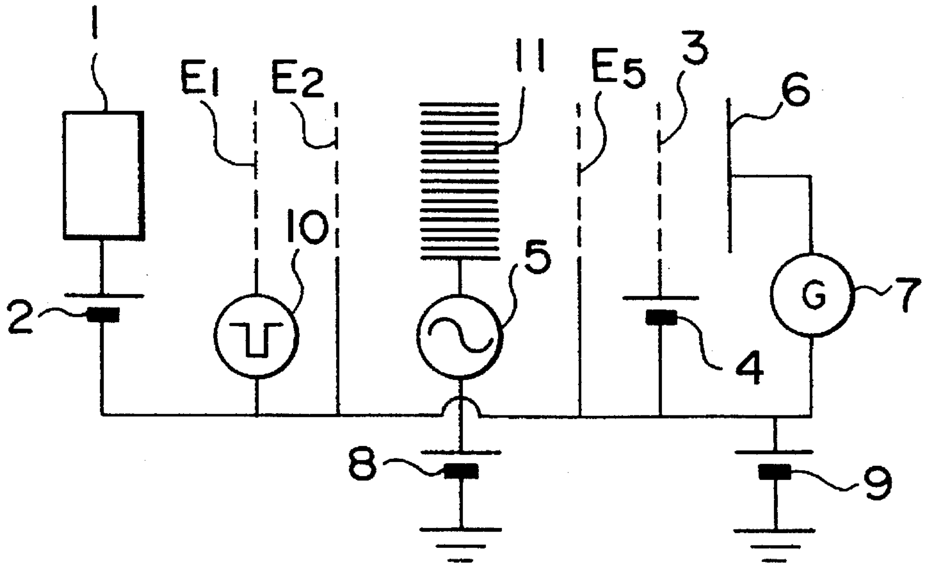

FIG. 5A shows a configuration to correspond to in FIG. 2G. FIGS. 5B to 5H correspond to the respective examples shown in FIGS. 3 and 4.

Figure 6:
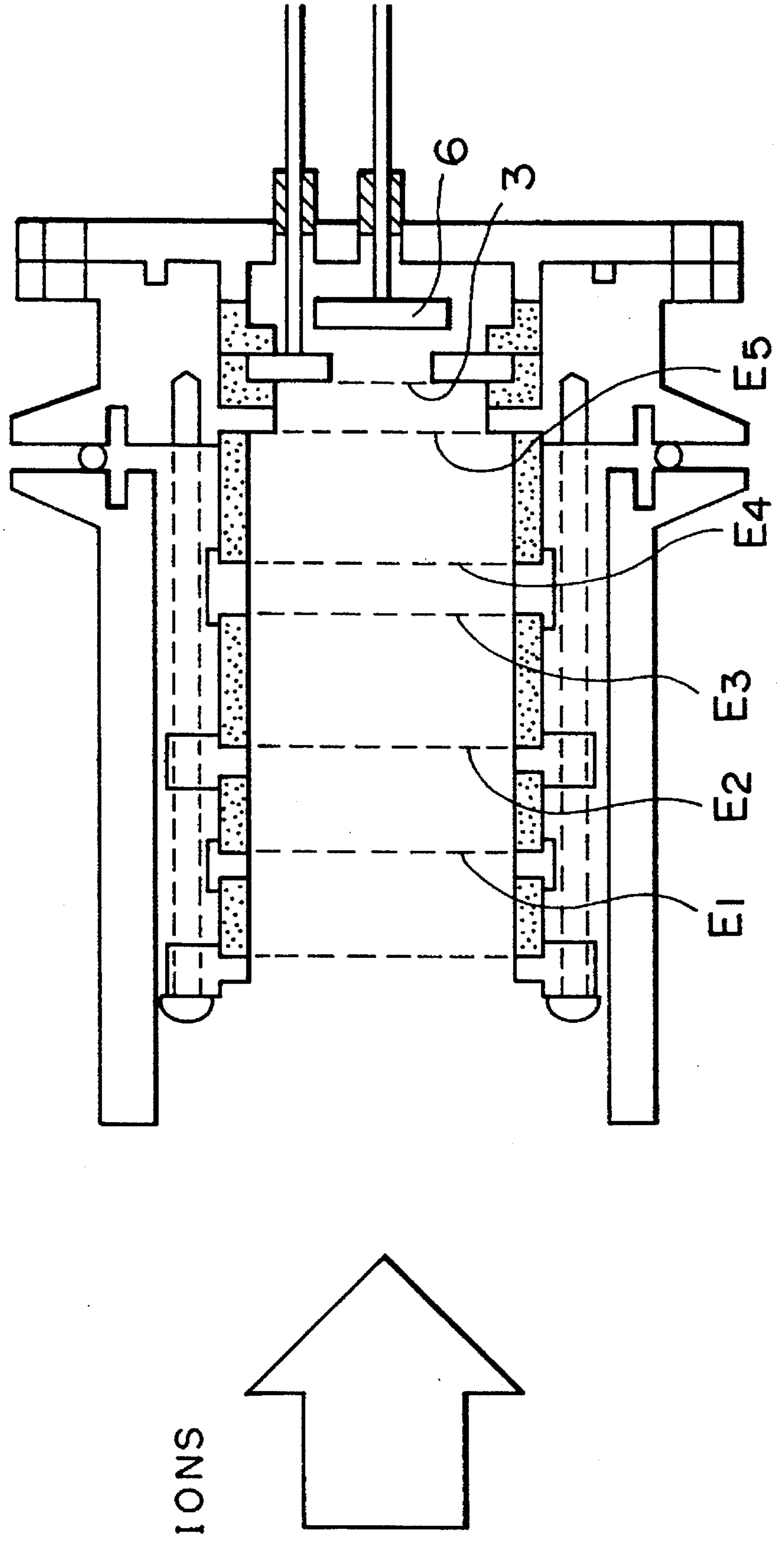
FIG. 6 is a cross sectional view of the essential sections of the mass spectrometer shown in FIG. 5C.
Figure 7:
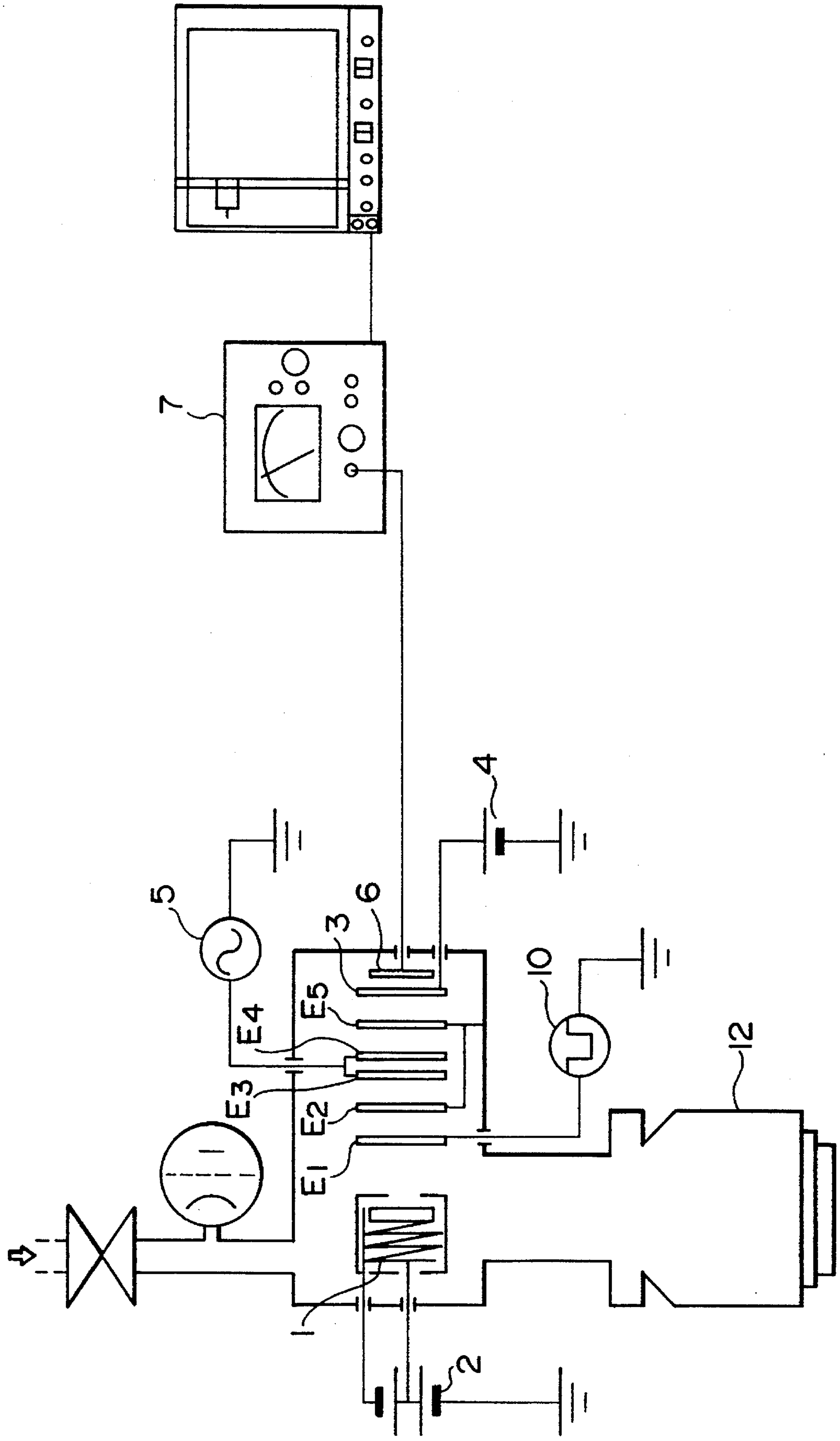
FIG. 7 is a schematic diagram of the structure of the high frequency mass spectrometer shown in FIG. 6.

FIGS. 6 and 7 present a mass spectrometer apparatus to correspond with that shown in FIG. 2C, and the overall apparatus is housed in an evacuated chamber 12 shown in FIG. 7. The ion source 1 produces sample ions by bombardment of thermal electrons which are emitted from heated filament, for example. The ion source 1 can be operated at 70–100 volts supplied by a direct current power source 2 for ion acceleration. Along the ionic beam path generated by the ion source, five mesh electrodes $E_1$ to $E_5$ are disposed parallel to each other. Each of the electrodes is made of woven fine wire of stainless steel, for example.

The electrode $E_1$ is provided with a shutter circuit 10 for injecting the ions of an equal potential at a specific phase of a high frequency electrical field. The electrodes $E_1$, $E_5$ are grounded, the electrodes $E_3$, $E_4$ are given the same potential and are impressed with a high frequency electric field. This arrangement of the electrodes produces an equi-potential space at ground potential (grounded equi-potential space) X between the electrodes $E_1$, $E_2$, and an equi-potential space with a high frequency electrical field (high frequency equi-potential space) Y between the electrodes $E_3$, $E_4$ as shown in FIG. 8B.

The ions having a specific kinetic energy are injected from electrode $E_1$ to electrode $E_2$ synchronously in phase with the high frequency electrical field. This action is provided by the shutter circuit 10 which allows control over the timing of the passing of ions through the electrode $E_1$ and the phase of the high frequency electrical field.

After passing through the electrodes $E_1$, the ions enter the grounded equi-potential space X between the electrodes $E_1$, $E_2$. The ions have a given kinetic energy but the ions of different target sample have different speeds depending on their ratios of the mass/charge, thus arriving at different times at the electrode $E_2$. After passing through the electrode $E_2$, the ions enter the high frequency electrical field. Here, the different ions, owing to their different times of arrival, are further separated by the application of the phases of the high frequency electrical field adjusted to a selected target ions.

When the ions enter the high frequency electrical field, the separation is achieved through a combined effects of two characteristics of the sample ions: the different motion energies, produced within the space between the electrodes $E_2$ to $E_3$; and the effects of the differing speeds, owing to different mass/charge ratios. Therefore, the ions of different species arrive at the electrode $E_4$ at different times.

The time differentials further provide separation in the high frequency phases applied to the sample ions within the space formed by electrodes $E_4$, $E_5$. The ions are given their final dispersion according to the kinetic energy spectra after passing through the electrode $E_5$. By utilizing the kinetic energy spectra, the potential of the ion repeller electrode 3 is chosen so that only those ions having the maximum kinetic energy will be able to reach the collector electrode 6. Those ions which were able to pass through the ion repeller electrode 3 and arriving at the collector electrode 6 provide the ion current which is measured. Qualitative and quantitative analyses of the target sample ions are performed on the basis of the magnitude of the ion current.

To confirm the performance of the actions described above, computer simulation of the ionic motions in the space between the electrodes was performed. The equations representing the motions of the ions in a high frequency electrical field are give below.

$$d^2x/dt^2=(eV_{pp}/md)\sin(2\pi ft+\phi)$$

$$dx/dt=(-A/2\pi f)\cos(2\pi ft+\phi)+C$$

$$X=[-A/(2\pi f)^2]\sin(2\pi ft+\phi)+Ct+D$$

where $A=eV_{pp}/md$ where e is the charge, $V_{pp}$ is the voltage of the electric field, m is the mass of the ions, d is distance of each electrodes, and C, D are integration constants, f is the frequency of the applied high frequency electric field, $\phi$ is the phase angle of the electric field, and t is the instantaneous time of ions moving upstream to downstream along the ion beam path measured along the X-axis.

Figure 8A:
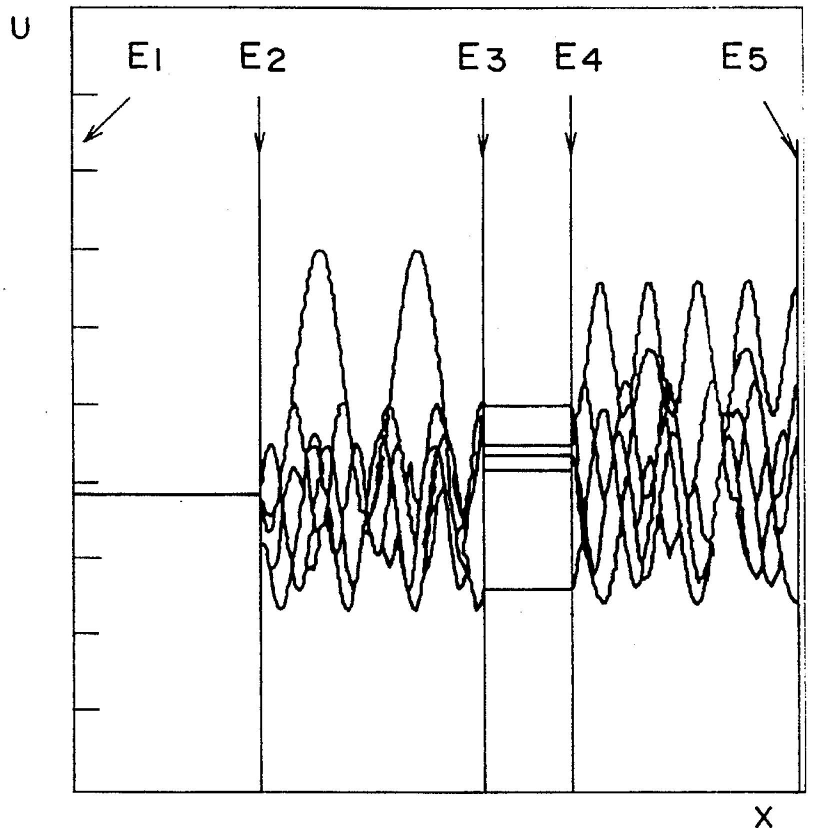
FIGS. 8A–B is a graph showing the results of computer simulation to obtain suitable operating parameters for the high frequency mass spectrometer of the embodiment shown in FIG. 6.
Figure 8B:
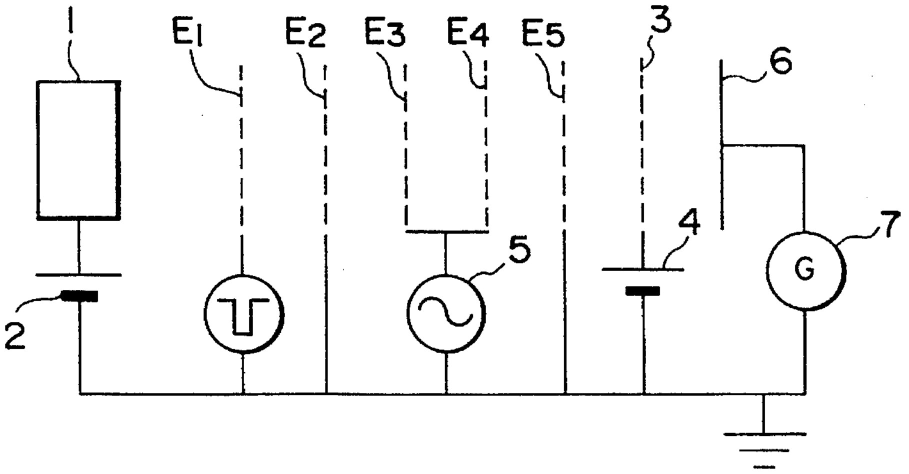

FIG. 8 shows a graphical result of computations relating the position of the apparatus along the horizontal axis and the kinetic energy on the vertical axis, using the integration constants C, D determined for the various motions in the spaces in the above equations, and numerically eliminating the time element t.

From the graph relating the position and the kinetic energy, it is possible to find parameters for maximizing the kinetic energy of a target sample (in this case, helium ions) at a particular electrode E in comparison to other sample ions.

Figure 9:
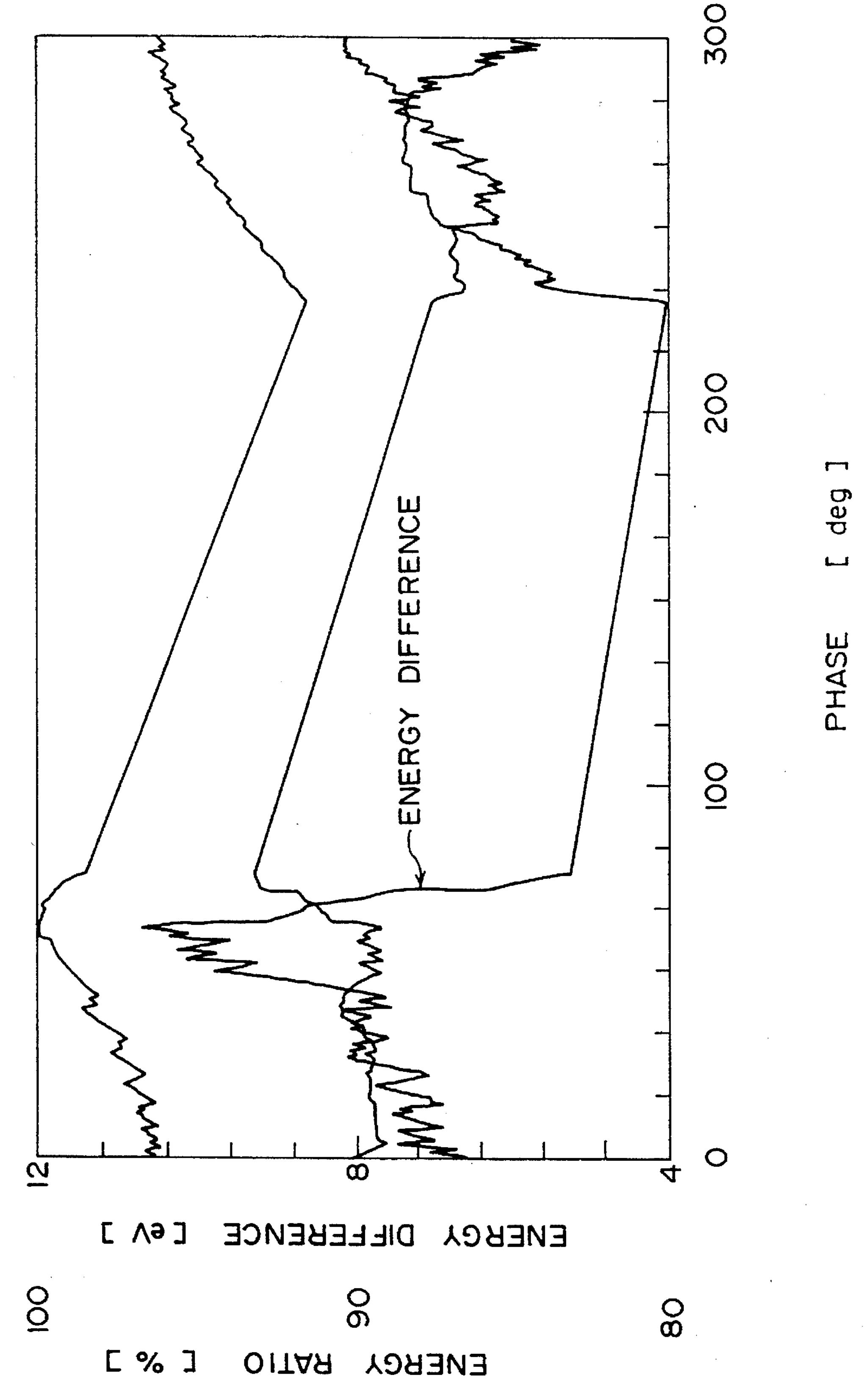
FIG. 9 is a schematic illustration of the energy and phase relationship in the high frequency mass spectrometer of the embodiment shown in FIG. 6.

In this method, it is necessary to maximize the energy difference between the highest and the second highest motion energies to maximize the resolving power of the apparatus. FIG. 9 shows an example of the relationship between the injection phase angle of an accelerating sample ion and the kinetic energy difference. To increase the sensitivity of the quantitative analytical apparatus, it is necessary to choose the operating parameters so as to increase the kinetic energy difference for a wide range of injection phase angle. From the results such as those illustrated in FIG. 9, it is possible to experimentally identify operating parameters, such as the timing for opening the shutter circuit 10 for synchronizing the injection phase, duration of opening and the magnitude of the potential to be applied to the ion repeller electrode.

EXPERIMENTAL RESULTS

Figure 10:
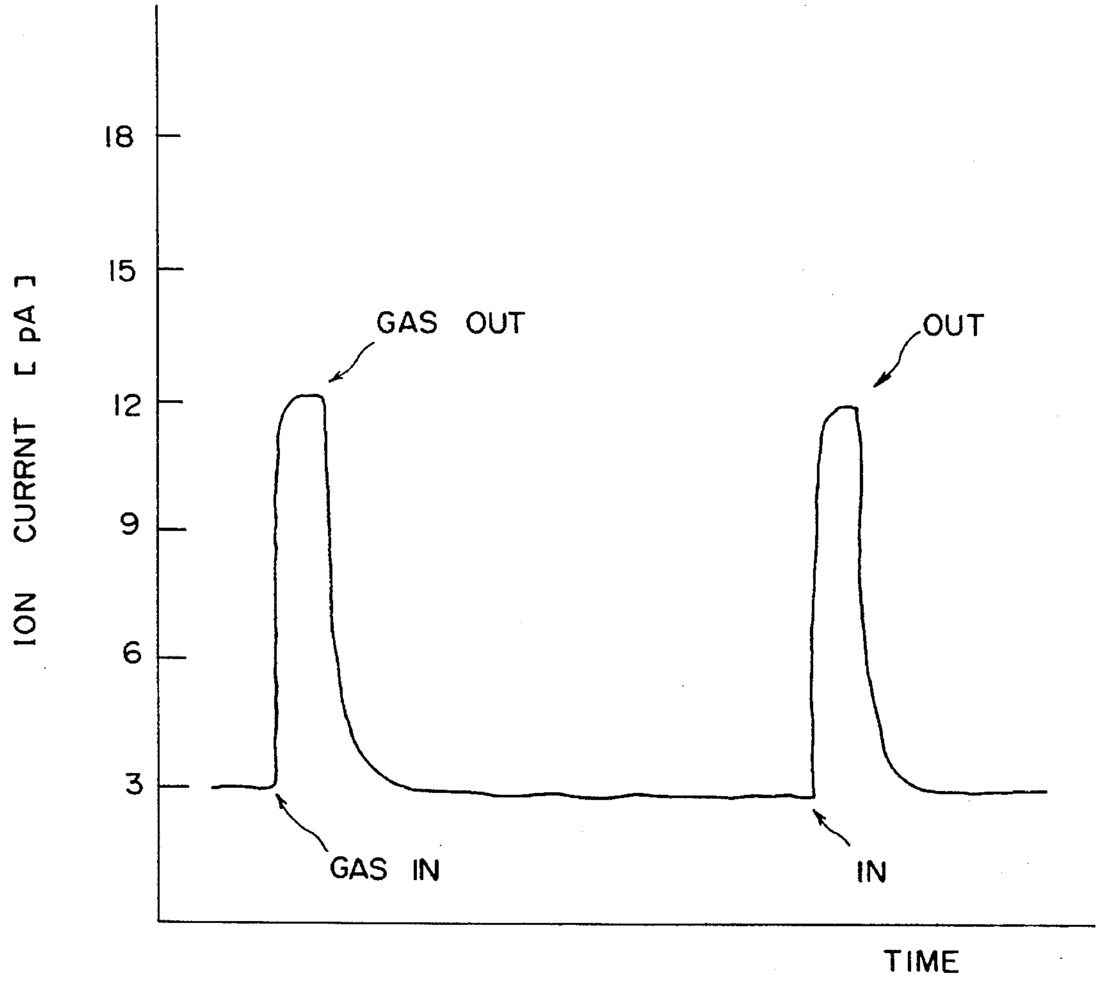
FIG. 10 is a graph showing changes in ion current with He gas input in the high frequency mass spectrometer of the embodiment shown in FIG. 6.
Figure 11:
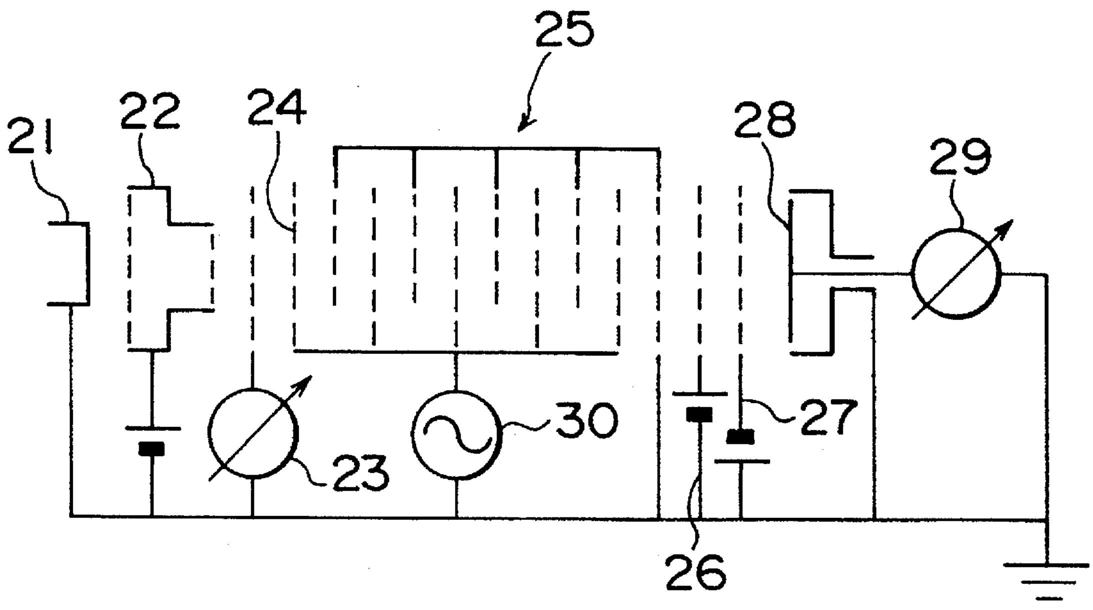
FIG. 11 is a schematic diagram showing the components in a conventional mass spectrometer.

Using the apparatus shown in embodiments of FIGS. 5 and 6, the validity of the principle of operation of the high frequency mass spectrometer apparatus of the present invention was demonstrated using the operating parameters obtained by computer simulation. The experiments were conducted in an evacuated chamber 12 using 100% gaseous helium, and the results shown in FIG. 10 demonstrated that a difference of 9 pA was produced in the values of the current flowing in the collector electrode 6 with and without the introduction of helium.

The present invention was demonstrated with embodiments having particular arrangement of electrodes, component configurations, materials and other associated details, which are illustrative and do not limit the invention in anyway. It is obvious that other choices are possible without departing from the principle of ion separation in a mass spectrometer presented here that the sample ions can be separated into respective species of target ions by flight time differentials further modulated with high frequency electric field to provide even more detailed spectra of ion energies to identify target ions contained in a plurality of sample ions.

What is claimed is:

1. A mass spectrometer apparatus comprising:

an ion source for generating sample ions;

an electrode system comprising a plurality of mesh electrodes disposed along an ion beam path;

an ammeter for measuring an ion current produced by sample ions that passed through said electrode system;

wherein said electrode system is provided with a high frequency space for application of a high frequency electric field between opposing mesh electrodes; and said sample ions are imparted with a specific kinetic energy and are injected from said ion source toward said electrode system synchronously with a phase of said high frequency electric field so as to produce a spectrum of motion energies of sample ions that pass through said high frequency space and to selectively collect only those sample ions having a maximum kinetic energy for mass spectrometric analysis.

2. A mass spectrometer apparatus as claimed in claim 1, wherein said apparatus is provided with at least a pair of high frequency spaces impressed with high frequency electric field with opposing polarities.

3. A mass spectrometer apparatus as claimed in claim 1, wherein said high frequency space comprises an electrode having a fixed voltage superimposed with a high frequency voltage.

4. A mass spectrometer apparatus as claimed in claim 1, wherein said apparatus is provided with a synchronizing means disposed downstream of said ion source for synchronizing an injection timing of said sample ions with a specific phase of said high frequency voltage to be applied to said high frequency space.

5. A mass spectrometer apparatus as claimed in claim 4, wherein said synchronizing means is a shutter circuit including electrical pulses.

6. A mass spectrometer apparatus comprising:

an ion source for generating sample ions;

an electrode system comprising a plurality of mesh electrodes disposed along an ion beam path;

an ammeter for measuring an ion current produced by sample ions that passed through said electrode system;

wherein along said ion beam path are disposed an equi-potential space having an equal voltage and a high frequency space impressed with a high frequency electric field between opposing mesh electrodes; and said sample ions are imparted with a specific kinetic energy and are injected from said ion source toward said electrodes system synchronously with a phase of said high frequency voltage, and said electrode system is operated so as to produce a spectrum of motion energies of sample ions by passing said sample ions through said equi-potential space and then through said high frequency space to selectively collect only those sample ions having a maximum kinetic energy for mass spectrometric analysis.

7. A mass spectrometer apparatus as claimed in claim 6, wherein said equi-potential space is impressed with a high frequency voltage.

8. A mass spectrometer apparatus as claimed in claim 6, wherein said equi-potential space is grounded.

9. A mass spectrometer apparatus as claimed in claim 6, wherein said electrode system is provided with both an equi-potential space impressed with a high frequency voltage and an equi-potential space which is grounded.

10. A mass spectrometer apparatus as claimed in claim 6, wherein said equi-potential space comprises a mesh electrode having a thickness equivalent to a plurality of mesh electrodes.

* * * * *